US012542091B2

(12) United States Patent
Tseng et al.

(10) Patent No.: US 12,542,091 B2
(45) Date of Patent: Feb. 3, 2026

(54) ELECTRONIC CIRCUIT

(71) Applicant: Innolux Corporation, Miaoli County (TW)

(72) Inventors: Ming-Chun Tseng, Miaoli County (TW); Kung-Chen Kuo, Miaoli County (TW); Lien-Hsiang Chen, Miaoli County (TW); Yong-Zhi Liu, Miaoli County (TW); Po-Syun Chen, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/331,170

(22) Filed: Jun. 7, 2023

(65) Prior Publication Data

US 2024/0021147 A1 Jan. 18, 2024

Related U.S. Application Data

(60) Provisional application No. 63/388,649, filed on Jul. 13, 2022.

(30) Foreign Application Priority Data

Mar. 3, 2023 (CN) ........................ 202310199134.X

(51) Int. Cl.
*G09G 3/32* (2016.01)
*G09G 3/3225* (2016.01)

(52) U.S. Cl.
CPC ............. *G09G 3/32* (2013.01); *G09G 3/3225* (2013.01); *G09G 2300/0819* (2013.01);
(Continued)

(58) Field of Classification Search
CPC ... G09G 2300/0819; G09G 2300/0426; G09G 2310/0251; G09G 3/3233; G09G 3/3266;
(Continued)

(56) References Cited

U.S. PATENT DOCUMENTS 11,955,073 B2 * 4/2024 Wang .................. G09G 3/3233
2004/0017238 A1 * 1/2004 Hyun .............. H03K 19/00323
327/218

(Continued)

OTHER PUBLICATIONS

"Office Action of Taiwan Counterpart Application", issued on Sep. 3, 2025, p. 1-p. 5.

*Primary Examiner* — Dismery Mercedes
(74) *Attorney, Agent, or Firm* — JCIPRNET

(57) ABSTRACT

An electronic circuit is provided. The electronic circuit includes a first transistor, a second transistor, a third transistor, a fourth transistor, a first compensation transistor, and a second compensation transistor. The first compensation transistor includes a first terminal, a second terminal, and a third terminal. The first terminal of the first compensation transistor is coupled to the second terminal of the first compensation transistor and a first connection node between the first transistor and the second transistor. The third terminal of the first compensation transistor receives one of a scan signal and a reset signal. The second compensation transistor includes a first terminal, a second terminal, and a third terminal. The second terminal of the second compensation transistor is coupled to a second connection node between the third transistor and the fourth transistor. The third terminal of the second compensation transistor receives a reference low voltage signal.

3 Claims, 5 Drawing Sheets

(52) U.S. Cl.
CPC ............... *G09G 2300/0842* (2013.01); *G09G 2320/0204* (2013.01); *G09G 2320/0214* (2013.01); *G09G 2320/0233* (2013.01); *G09G 2320/0257* (2013.01); *G09G 2320/043* (2013.01)

(58) Field of Classification Search
CPC ..... G09G 2300/0842; G09G 2320/045; G09G 3/32; G09G 2300/043; G09G 2320/043; G09G 2320/0257; G09G 2320/0214; G09G 2320/0209; G09G 2320/046
See application file for complete search history.

(56) References Cited

U.S. PATENT DOCUMENTS

| | | | | |
|---|---|---|---|---|
| 2007/0171177 | A1 | 7/2007 | Kim et al. | |
| 2011/0157126 | A1* | 6/2011 | Chung | G09G 3/3233 345/76 |
| 2011/0157144 | A1* | 6/2011 | Park | G09G 3/3233 345/212 |
| 2013/0069852 | A1* | 3/2013 | Liao | G09G 3/3233 345/77 |
| 2017/0162121 | A1* | 6/2017 | Yang | G06F 3/007 |
| 2018/0033370 | A1* | 2/2018 | Zheng | G09G 3/3233 |
| 2019/0237006 | A1* | 8/2019 | Cheng | G09G 3/3225 |
| 2020/0327853 | A1* | 10/2020 | Li | G09G 3/3233 |
| 2021/0407414 | A1* | 12/2021 | Kim | G09G 3/3291 |
| 2022/0101783 | A1* | 3/2022 | Han | G09G 3/32 |
| 2022/0114952 | A1 | 4/2022 | Tseng et al. | |
| 2022/0406243 | A1* | 12/2022 | Cong | G09G 3/32 |
| 2023/0178015 | A1* | 6/2023 | Wang | G09G 3/3233 345/204 |
| 2023/0343293 | A1* | 10/2023 | Gai | G09G 3/3233 |
| 2023/0343294 | A1* | 10/2023 | Guo | G09G 3/3233 |
| 2024/0021154 | A1* | 1/2024 | Zeng | G09G 3/3233 |

* cited by examiner

ELECTRONIC CIRCUIT

CROSS-REFERENCE TO RELATED APPLICATION

This application claims the priority benefits of U.S. provisional application Ser. No. 63/388,649, filed on Jul. 13, 2022, and China application serial no. 202310199134.X, filed on Mar. 3, 2023. The entirety of each of the above-mentioned patent applications is hereby incorporated by reference herein and made a part of this specification.

BACKGROUND

Technical Field

The disclosure relates to an electronic circuit; more particularly, the disclosure relates to an electronic circuit that includes at least one compensation transistor.

Description of Related Art

Existing electronic circuits includes transistors. A first terminal of a transistor may receive a control signal. A second terminal of the transistor may receive data or a reference voltage. A third terminal of the transistor may be coupled to a node. In response to the control signal, the transistor is turned on, and a bias node may be generated based on the received data or reference voltage. However, the operation of the transistor may become abnormal due to factors including process variations, electrostatic discharge (ESD) damages, high temperature aging, and so on, whereby unexpected conductance or current leakage may occur. As a result, the node on the electronic circuit may be affected and biased in an unexpected manner.

SUMMARY

The disclosure provides an electronic circuit that includes at least one compensation transistor. The compensation transistor is capable of reducing or preventing unexpected bias of a node when a transistor encounters abnormal issues, such as unexpected conductance or current leakage.

An embodiment of the disclosure provides an electronic circuit that includes a first transistor, a second transistor, a third transistor, a fourth transistor, a first compensation transistor, and a second compensation transistor. The first compensation transistor includes a first terminal, a second terminal, and a third terminal. The first terminal of the first compensation transistor is coupled to the second terminal of the first compensation transistor and a first connection node between the first transistor and the second transistor. The third terminal of the first compensation transistor receives one of a scan signal and a reset signal. The second compensation transistor includes a first terminal, a second terminal, and a third terminal. The second terminal of the second compensation transistor is coupled to a second connection node between the third transistor and the fourth transistor. The third terminal of the second compensation transistor receives a reference low voltage signal.

An embodiment of the disclosure provides an electronic circuit that includes a first transistor, a second transistor, a first compensation transistor, and a second compensation transistor. The first compensation transistor includes a first terminal, a second terminal, and a third terminal. The first terminal of the first compensation transistor is coupled to the second terminal of the first compensation transistor and a first connection node between the first transistor and the second transistor. The third terminal of the first compensation transistor receives one of a scan signal and a reset signal. The second compensation transistor includes a first terminal, a second terminal, and a third terminal. The second terminal of the second compensation transistor is coupled to the first connection node. The third terminal of the second compensation transistor receives a reference low voltage signal.

An embodiment of the disclosure provides an electronic circuit that includes a first transistor, a second transistor, and a first compensation transistor. The first transistor includes a first terminal, a second terminal, and a third terminal. The second terminal of the first transistor receives a reference high voltage signal, and the third terminal of the first transistor is coupled to a first connection node. The second transistor includes a first terminal, a second terminal, and a third terminal, and the second terminal of the second transistor is coupled to the first connection node. The first compensation transistor includes a first terminal, a second terminal, and a third terminal. The first terminal of the first compensation transistor is coupled to the third terminal of the second transistor, the second terminal of the first compensation transistor is coupled to the first connection node, and the third terminal of the first compensation transistor receives a reference low voltage signal.

In view of the foregoing, the electronic circuit provided in one or more embodiments of the disclosure includes the compensation transistor, and the compensation transistor compensates relevant nodes (e.g., the connection node, a voltage stabilizing node, and so on). Hence, when the transistors encounter abnormal issues, such as unexpected conductance or current leakage, the compensation transistor is capable of reducing or preventing the connection node or other nodes from suffering from an unexpected bias.

In order for the features and advantages of the disclosure to be more comprehensible, the following specific embodiments are described in detail in conjunction with the drawings.

BRIEF DESCRIPTION OF THE DRAWINGS

The accompanying drawings, which are included to provide a further understanding of the disclosure, are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
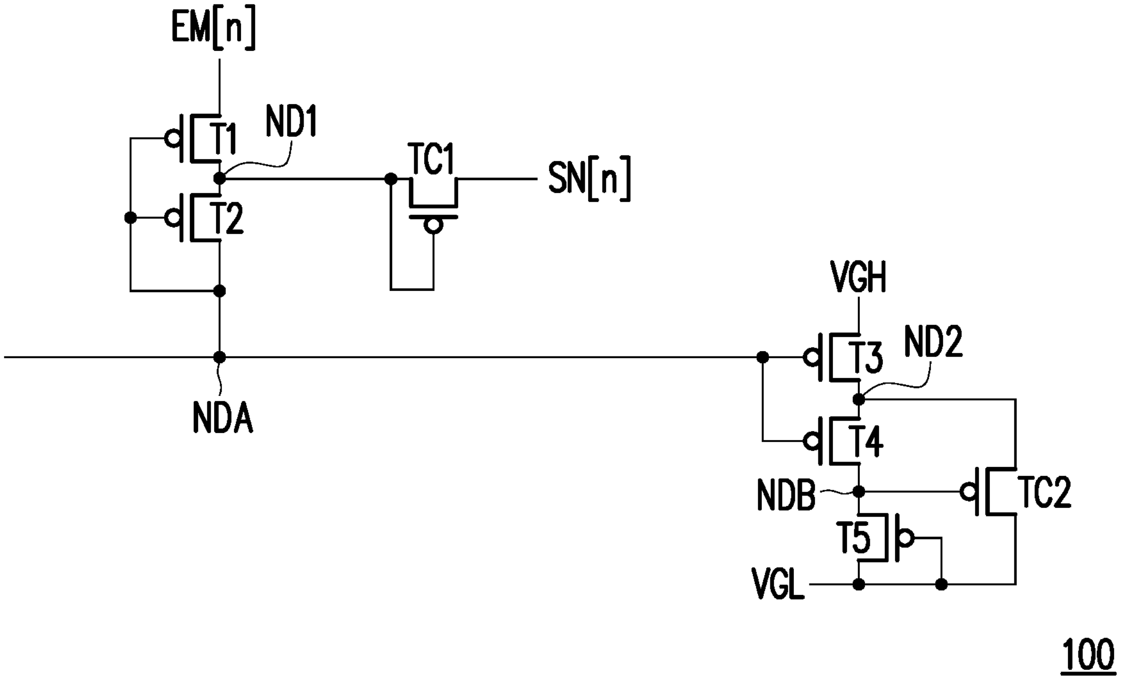
FIG. 1 is a schematic view of an electronic circuit according to a first embodiment of the disclosure.

The disclosure may be understood with reference to the following detailed description with the drawings. Note that for clarity of description and ease of understanding, the drawings of the disclosure show a part of an electronic device, and certain elements in the drawings may not be drawn to scale. In addition, the number and size of each device shown in the drawings simply serve for exemplifying instead of limiting the scope of the disclosure.

Certain terminologies are used throughout the description and the appended claims to refer to specific elements. As to be understood by those skilled in the art, electronic device manufacturers may refer to an element by different names. Herein, it is not intended to distinguish between elements that have different names instead of different functions. In the following description and claims, terminologies such as "include", "comprise", and "have" are used in an open-ended manner, and thus should be interpreted as "including, but not limited to". Therefore, the terminologies "include", "comprise", and/or "have" used in the description of the disclosure denote the presence of corresponding features, regions, steps, operations, and/or elements but are not limited to the presence of one or more corresponding features, regions, steps, operations, and/or elements.

It should be understood that when one element is referred to as being "coupled to", "connected to", or "conducted to" another element, the one element may be directly connected to the another element with electrical connection established, or intervening elements may also be present in between these elements for electrical interconnection (indirect electrical connection). Comparatively, when one element is referred to as being "directly coupled to", "directly conducted to", or "directly connected to" another element, no intervening elements are present in between.

Although terminologies such as first, second, and third may be used to describe different diverse constituent elements, such constituent elements are not limited by the terminologies. The terminologies are used simply to discriminate one constituent element from other constituent elements in the description. In the claims, the terminologies first, second, third, and so on may be used in accordance with the order of claiming elements instead of using the same terminologies. Accordingly, a first constituent element in the following description may be a second constituent element in the claims.

The electronic device provided in the disclosure may include but is not limited to a display device, an antenna device, a sensing device, a light-emitting device, a touch display, a curved display, or a free-shape display. The electronic device may include a bendable or flexible electronic device. The electronic device may include, for instance, liquid crystal, light emitting diode (LED), quantum dot (QD), fluorescence, phosphor, other suitable display media, or a combination thereof, which should however not be construed as a limitation in the disclosure. The LED may include, for instance, an organic light-emitting diode (OLED), a mini LED, a micro LED, a quantum dot LED (including QLED and QDLED), other suitable materials, or a combination thereof, which should however not be construed as a limitation in the disclosure. The display device may, for instance, include a tiled display device, which should however not be construed as a limitation in the disclosure. The antenna device may, for instance, include a liquid crystal antenna, which should however not be construed as a limitation in the disclosure. The antenna device may, for instance, include a tiled antenna device, which should however not be construed as a limitation in the disclosure. Note that the electronic device may be any arrangement or combination of the above, which should however not be construed as a limitation in the disclosure. In addition, the shape of the electronic device may be a rectangle, a circle, a polygon, a shape with a curved edge, or other suitable shapes. The electronic device may have a peripheral system, for instance, a driving system, a control system, or a light source system, to support the display device, the antenna device, or the tiled device, which should however not be construed as a limitation in the disclosure. The sensing device may include a camera, an infrared sensor, or a fingerprint sensor, and the disclosure is not limited thereto. In some embodiments, the sensing device may also include a flash, an infrared (IF) light source, other sensors, electronic elements, or a combination thereof, which should however not be construed as a limitation in the disclosure.

In one or more embodiments of the disclosure, terminologies such as "pixel" or "pixel unit" are used as a unit for describing a specific region including at least one functional circuit for at least one specific function. The region of a "pixel" depends on the unit for providing a specific function. Adjacent pixels may share the same parts or wires, but may also include their own specific parts therein. For instance, adjacent pixels may share the same scan line or the same data line, but the pixels may also have their own transistors or capacitors.

Note that features in different embodiments described below may be replaced, recombined, or mixed with each other to form another embodiment without departing from the spirit of the disclosure.

Please refer to FIG. 1, which is a schematic view of an electronic circuit according to a first embodiment of the disclosure. In this embodiment, an electronic circuit 100 includes transistors T1-T4, a first compensation transistor TC1, and a second compensation transistor TC2. The first compensation transistor TC1 includes a first terminal, a second terminal, and a third terminal. The first terminal of the first compensation transistor TC1 is coupled to the second terminal of the first compensation transistor TC1 and a first connection node ND1 between the transistors T1 and T2. The third terminal of the first compensation transistor TC1 receives one of a scan signal SN[n] and a reset signal (not shown). In this embodiment, the third terminal of the first compensation transistor TC1 exemplarily receives the scan signal SN[n]. The second compensation transistor TC2 includes a first terminal, a second terminal, and a third terminal. The second terminal of the second compensation transistor TC2 is coupled to a second connection node ND2 between the transistors T3 and T4. The third terminal of the second compensation transistor TC2 receives a reference low voltage signal VGL. The first terminal of the first compensation transistor TC1 may be a gate, and so is the first terminal of the second compensation transistor TC2. In this embodiment, the transistors T1-T4, the first compensation transistor TC1, and the second compensation transistor TC2 are p-type transistors, respectively, which should however not be construed as a limitation in the disclosure.

In this embodiment, a first terminal of the transistor T1 is coupled to a first terminal of the transistor T2 and a voltage stabilizing node NDA. A second terminal of the transistor T1 receives an enabling signal EM[n]. A third terminal of the transistor T1 is coupled to a second terminal of the transistor T2 and the first connection node ND1. A third terminal of the transistor T2 is coupled to the voltage stabilizing node NDA. The transistors T1 and T2 may be reset circuits. When the enabling signal EM[n] is at a high voltage level, the transistors T1 and T2 reset a voltage level at the voltage stabilizing node NDA to a high voltage level.

For instance, under the expected circumstances, a voltage value at the voltage stabilizing node NDA is at a high voltage level. However, when at least one of the transistors T1 and T2 becomes abnormal, the abnormal transistor of the transistors T1 and T2 may become a depletion mode transistor. The above-mentioned abnormalities may be caused by process variations, ESD damages, high temperature aging, and other factors. The abnormal transistor of the transistors T1 and T2 is turned on unexpectedly. The voltage value at the voltage stabilizing node NDA is biased toward an abnormally low voltage level. However, the first compensation transistor TC1 provides the scan signal SN[n] at the high voltage level to the first connection node ND1. The first connection node ND1 has the high voltage level. Thereby, the first compensation transistor TC1 may use the scan signal SN[n] at the high voltage level to reduce the current leakage resulting from the at least one abnormal transistor of the transistors T1 and T2.

In this embodiment, a first terminal of the transistor T3 is coupled to a first terminal of the transistor T4 and the voltage stabilizing node NDB. A second terminal of the transistor T3 is coupled to a reference high voltage signal VGH. A third terminal of the transistor T3 is coupled to a second terminal of the transistor T4 and the second connection node ND2. A third terminal of the transistor T4 is coupled to the voltage stabilizing node NDB.

For instance, under the expected circumstances, the voltage value at the voltage stabilizing node NDB is at a low voltage level. When at least one of the transistors T3 and T4 becomes abnormal and becomes a depletion mode transistor, the abnormal transistor of the transistors T3 and T4 is turned on unexpectedly. The voltage value at the voltage stabilizing node NDB is biased toward an abnormally low voltage level. However, the second compensation transistor TC2 may use the reference low voltage signal VGL to reduce the possibility of current leakage in the depletion mode transistor transformed from at least one of the transistors T3 and T4.

In light of the foregoing, the first compensation transistor TC1 and the second compensation transistor TC2 respectively perform voltage compensation on the connection nodes (e.g., the first connection node ND1 and the second connection node ND2) between the transistors.

In this embodiment, the electronic circuit 100 further includes a transistor T5. The transistor T5 is, for instance, a p-type transistor, which should however not be construed as a limitation in the disclosure. A first terminal of the transistor T5 is coupled to a third terminal of the transistor T5, the reference low voltage signal VGL, and the third terminal of the second compensation transistor TC2. A second terminal of the transistor T5 is coupled to the voltage stabilizing node NDB and the first terminal of the second compensation transistor TC2. Therefore, the second compensation transistor TC2 may be turned on continuously.

Figure 2:
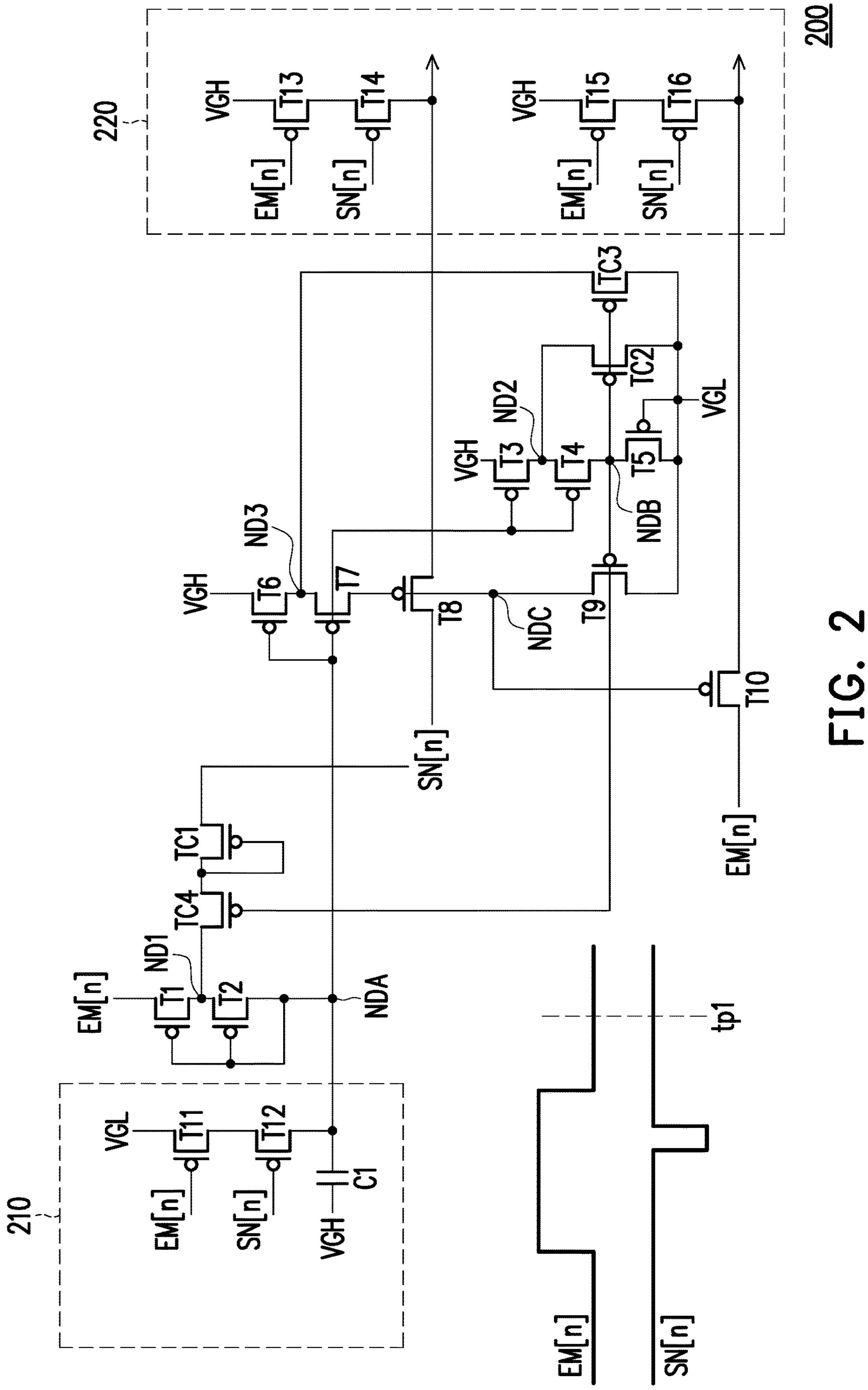
FIG. 2 is a schematic view of an electronic circuit according to a second embodiment of the disclosure.

Please refer to FIG. 2, which is a schematic view of an electronic circuit according to a second embodiment of the disclosure. In this embodiment, an electronic circuit 200 includes transistors T1-T10, the first compensation transistor TC1, the second compensation transistor TC2, a third compensation transistor TC3, and a fourth compensation transistor TC4. The embodiment of the electronic circuit 200 is, for instance, a derivative embodiment of the electronic circuit 100. The coupling method of the transistors T1-T5 has been clearly explained in the embodiment depicted in FIG. 1 and therefore no further description will be provided hereinafter. A first terminal of the transistor T6 is coupled to the voltage stabilizing node NDA and a first terminal of the transistor T7. A second terminal of the transistor T6 is coupled to the reference high voltage signal VGH. A third terminal of the transistor T6 is coupled to a third connection node ND3 and a second terminal of the transistor T7. A third terminal of the transistor T7 is coupled to the voltage stabilizing node NDC.

A first terminal of the transistor T8 is coupled to the voltage stabilizing node NDC. A second terminal of the transistor T8 receives the scan signal SN[n]. A third terminal of the transistor T8 serves as a first output terminal of the electronic circuit 200. A first terminal of the transistor T9 is coupled to the voltage stabilizing node NDB. A second terminal of the transistor T9 is coupled to the voltage stabilizing node NDC. A third terminal of the transistor T9 is coupled to the reference low voltage signal VGL. A first terminal of the transistor T10 is coupled to the voltage stabilizing node NDC. A second terminal of the transistor T10 receives the enabling signal EM[n]. A third terminal of the transistor T10 serves as a second output terminal of the electronic circuit 200.

In this embodiment, a first terminal of the first compensation transistor TC1 is coupled to a second terminal of the first compensation transistor TC1 and the first connection node ND1. A third terminal of the first compensation transistor TC1 receives the scan signal SN[n] of the first compensation transistor TC1. A second terminal of the second compensation transistor TC2 is coupled to the second connection node ND2. A third terminal of the second compensation transistor TC2 receives the reference low voltage signal VGL. A first terminal of the third compensation transistor TC3 is coupled to the first terminal of the second compensation transistor TC2. A third terminal of the third compensation transistor TC3 is coupled to the third terminal of the second compensation transistor TC2 and the reference low voltage signal VGL. A second terminal of the third compensation transistor TC3 is coupled to the third connection node ND3. The fourth compensation transistor TC4 is coupled with the first compensation transistor TC1. A first terminal of the fourth compensation transistor TC4 is coupled to the first terminal of the second compensation transistor TC2. A second terminal of the fourth compensation transistor TC4 is coupled to the first connection node ND1. A third terminal of the fourth compensation transistor TC4 is coupled to the second terminal of the first compensation transistor TC1. In addition, the first terminal of the fourth compensation transistor TC4 is further coupled to the first terminal of the third compensation transistor TC3. In this embodiment, the transistors T1-T10, the first compensation transistor TC1, the second compensation transistor TC2, the third compensation transistor TC3, and the fourth compensation transistor TC4 are, for instance, p-type transistors, respectively, which should however not be construed as a limitation in the disclosure.

In this embodiment, under the expected circumstances, the voltage value at the voltage stabilizing node NDC is at a low voltage level. Therefore, under the expected circumstances, the transistors T8 and T10 are turned on respectively in response to the low voltage level located at the voltage stabilizing node NDC, thereby transmitting scan signal SN[n] and enabling signal EM[n]. When at least one of the transistors T6 and T7 is turned on unexpectedly, the voltage value at the voltage stabilizing node NDC is biased toward a low voltage level, and the operation of the transistors T8 and T10 may become abnormal. The third compensation transistor TC3 may use the reference low voltage signal VGL to ensure the third connection node ND3 to be at a low voltage level. The third compensation transistor TC3 may reduce the possibility of current leakage in at least one of the transistors T7 and T8. Thereby, the voltage value at the voltage stabilizing node NDC may be maintained at a low voltage level.

For instance, in this embodiment, the electronic circuit 200 further includes a detection circuit 210. The detection circuit 210 detects the voltage level of the scan signal SN[n] and the enabling signal EM[n] at a time point tp1 (which should not be construed as a limitation in the disclosure).

The detection circuit 210 includes transistors T11 and T12 and a capacitor C1. A first terminal of the transistor T11 receives the enabling signal EM[n]. A second terminal of the transistor T11 receives the reference low voltage signal VGL. A first terminal of the transistor T12 receives the scan signal SN[n]. A second terminal of the transistor T12 is coupled to a third terminal of the transistor T11. A third terminal of the transistor T12 is coupled to the voltage stabilizing node NDA. The capacitor C1 is coupled to the reference high voltage signal VGH and the voltage stabilizing node NDA.

For instance, the transistors T11 and T12 may be p-type transistors, respectively, which should however not be construed as a limitation in the disclosure. Under the expected circumstances, the voltage level of the scan signal SN[n] and the voltage level of the enabling signal EM[n] are not simultaneously at the low voltage level. The transistors T11 and T12 are not turned on at the same time. Therefore, at the time point tp1, the voltage value at the voltage stabilizing node NDA is at a high voltage level. However, when at least one of the transistors T11 and T12 becomes abnormal and becomes a depletion mode transistor, the voltage value at the voltage stabilizing node NDA is biased toward a low voltage level. Here, at the time point tp1, the transistor T1 provides the scan signal SN[n] having a high voltage level to the first connection node ND1. Therefore, the first connection node ND1 has a high voltage level.

In addition, in this embodiment, the electronic circuit 200 further includes a correction circuit 220. The correction circuit 220 corrects the voltage level of the first output terminal and the voltage level of the second output terminal of the electronic circuit 200 according to the scan signal SN[n] and the enabling signal EM[n].

The correction circuit 220 includes transistors T13-T16. A first terminal of the transistor T13 receives the enabling signal EM[n]. A second terminal of the transistor T13 is coupled to the reference high voltage signal VGH. A first terminal of the transistor T14 receives the scan signal SN[n]. A second terminal of the transistor T14 is coupled to a third terminal of the transistor T13. A third terminal of the transistor T14 is coupled to the third terminal of the transistor T8. A first terminal of the transistor T15 receives the enabling signal EM[n]. A second terminal of the transistor T15 is coupled to the reference high voltage signal VGH. A first terminal of the transistor T16 receives the scan signal SN[n]. A second terminal of the transistor T16 is coupled to a third terminal of the transistor T15. A third terminal of the transistor T16 is coupled to the third terminal of the transistor T15.

In this embodiment, the transistors T13-T16 are, for instance, p-type transistors, respectively, which should however not be construed as a limitation in the disclosure.

Figure 3:
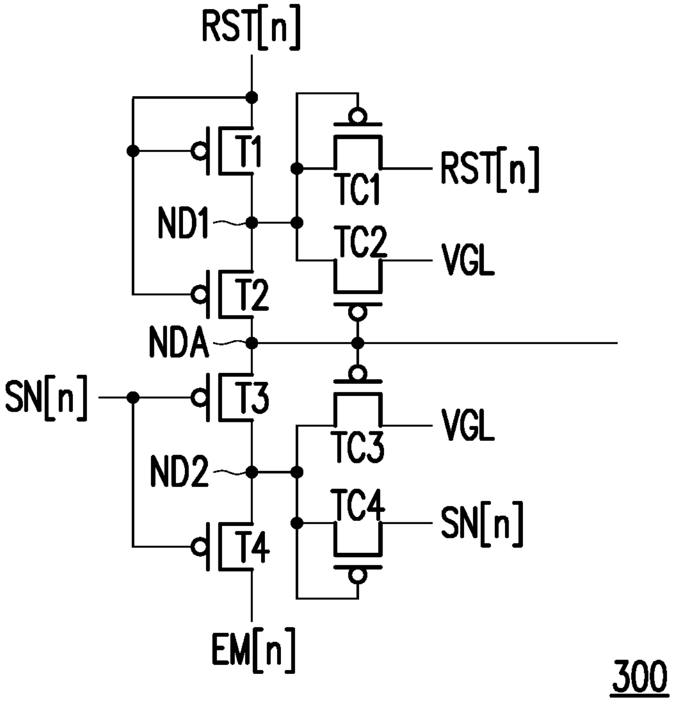
FIG. 3 is a schematic view of an electronic circuit according to a third embodiment of the disclosure.

Please refer to FIG. 3, which is a schematic view of an electronic circuit according to a third embodiment of the disclosure. In this embodiment, an electronic circuit 300 includes the transistors T1 and T2, the first compensation transistor TC1, and the second compensation transistor TC2. The first terminal of the transistor T1 is coupled to the second terminal of the transistor T1 and a reset signal RST[n]. The third terminal of the transistor T1 is coupled to the first connection node ND1. The first terminal of the transistor T2 is coupled to the second terminal of the transistor T1 and the reset signal RST[n]. The second terminal of the transistor T2 is coupled to the first connection node ND1. The third terminal of the transistor T2 is coupled to the voltage stabilizing node NDA.

In this embodiment, the first terminal of the first compensation transistor TC1 is coupled to the second terminal of the first compensation transistor TC1 and the first connection node ND1. One of the third terminal of the first compensation transistor TC1 receives the scan signal SN[n] and the reset signal RST[n]. In this embodiment, the third terminal of the first compensation transistor TC1 exemplarily receives the reset signal RST[n]. The second terminal of the second compensation transistor TC2 is coupled to the first connection node ND1. The third terminal of the second compensation transistor TC2 receives the reference low voltage signal VGL. The first terminal of the second compensation transistor TC2 is coupled to the voltage stabilizing node NDA.

For instance, under the expected circumstances, the voltage value at the voltage stabilizing node NDA is at a high voltage level. However, when the voltage stabilizing node NDA has a low voltage level, the second compensation transistor TC2 makes the first connection node ND1 to have a low voltage level. At this time, the first compensation transistor TC1 provides the reset signal RST[n] with a high voltage level to the first connection node ND1. The first connection node ND1 has a high voltage level.

In this embodiment, the electronic circuit 300 further includes the transistors T3 and T4, the third compensation transistor TC3, and the fourth compensation transistor TC4. The first terminal of the transistor T3 is coupled to the first terminal of the transistor T4 and the scan signal SN[n]. The second terminal of the transistor T3 is coupled to the voltage stabilizing node NDA. The third terminal of the transistor T3 is coupled to the second connection node ND2. The second terminal of the transistor T4 is coupled to the second connection node ND2. The third terminal of the transistor T4 receives the enabling signal EM[n].

The first terminal of the third compensation transistor TC3 is coupled to the first terminal of the second compensation transistor TC2. The second terminal of the third compensation transistor TC3 is coupled to the second connection node ND2. The third terminal of the third compensation transistor TC3 receives the reference low voltage signal VGL.

The fourth compensation transistor TC4 is coupled to the third compensation transistor TC3. The third terminal of the fourth compensation transistor receives the other one of the scan signal SN[n] and the reset signal RST[n]. In this embodiment, the third terminal of the fourth compensation transistor TC4 exemplarily receives the scan signal SN[n]. In addition, the first terminal of the fourth compensation transistor TC4 is coupled to the second terminal of the fourth compensation transistor TC4 and the second connection node ND2.

In this embodiment, the transistors T1-T4, the first compensation transistor TC1, the second compensation transistor TC2, the third compensation transistor TC3, and the fourth compensation transistor TC4 may be p-type transistors, respectively, which should however not be construed as a limitation in the disclosure. For instance, when the transistors T3 and T4, the second compensation transistor TC2, and the third compensation transistor TC3 become abnormal and become depletion mode transistors, the voltage value at the voltage stabilizing node NDA is biased toward a low voltage level. However, the first compensation transistor TC1 provides the reset signal RST[n] with a high voltage level to the first connection node ND1. The fourth compensation transistor TC4 provides the scan signal SN[n] with a high voltage level to the second connection node ND2. Therefore, the first connection node ND1 and the second connection node ND2 still have a high voltage level. Accordingly, the current leakage at the voltage stabilizing node NDA having a low voltage level may be improved.

Besides, for instance, under the expected circumstances, the voltage value of the voltage stabilizing node NDA is at a low voltage level. When the transistors T1-T4, the first compensation transistor TC1, and the fourth compensation transistor TC4 become abnormal and become depletion mode transistors, the voltage value at the voltage stabilizing node NDA is biased toward a high voltage level. However, the second compensation transistor TC2 and the third compensation transistor TC3 ensure the first connection node ND1 and the second connection node ND2 to have a low voltage level. Therefore, the current leakage at the voltage stabilizing node NDA having a high voltage level may be improved.

Figure 4:
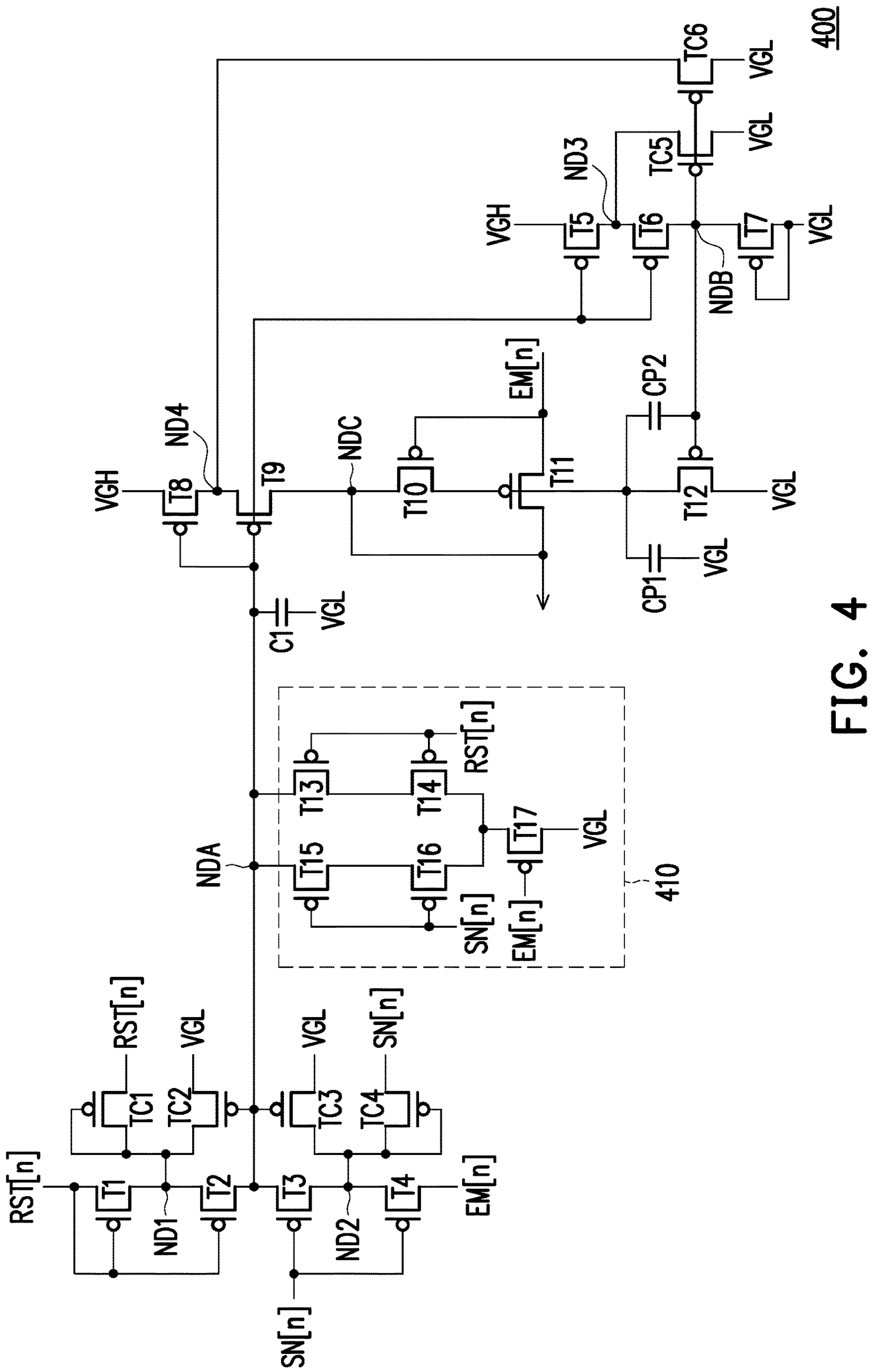
FIG. 4 is a schematic view of an electronic circuit according to a fourth embodiment of the disclosure.

Please refer to FIG. 4, which is a schematic view of an electronic circuit according to a fourth embodiment of the disclosure. In this embodiment, an electronic circuit 400 include the transistors T1-T12, the first compensation transistor TC1, the second compensation transistor TC2, the third compensation transistor TC3, the fourth compensation transistor TC4, a fifth compensation transistor TC5, a sixth compensation transistor TC6, and capacitors C1, CP1, and CP2. The embodiment of the electronic circuit 400 is, for instance, a derivative embodiment of the electronic circuit 300. The implementation manner of the transistors T1-T4, the first compensation transistor TC1, the second compensation transistor TC2, the third compensation transistor TC3, and the fourth compensation transistor TC4 has been clearly described in the embodiment depicted in FIG. 3 and thus will not be further described hereinafter.

The first terminal of the transistor T5 is coupled to the first terminal of the transistor T6 and the voltage stabilizing node NDA. The second terminal of the transistor T5 is coupled to the reference high voltage signal VGH. The third terminal of the transistor T5 is coupled to the second terminal of the transistor T6 and the third connection node ND3. The third terminal of the transistor T6 is coupled to the voltage stabilizing node NDB. The first terminal of the transistor T7 is coupled to the third terminal of the transistor T7 and the reference low voltage signal VGL. The second terminal of the transistor T7 is coupled to the voltage stabilizing node NDB. The first terminal of the transistor T8 is coupled to the voltage stabilizing node NDA and the first terminal of the transistor T9. The second terminal of the transistor T8 is coupled to the reference high voltage signal VGH. The third terminal of the transistor T8 is coupled to the fourth connection node ND4 and the second terminal of the transistor T9. The third terminal of the transistor T9 is coupled to the voltage stabilizing node NDC. The first terminal of the transistor T10 receives the enabling signal EM[n]. The second terminal of the transistor T10 is coupled to the voltage stabilizing node NDC. The first terminal of the transistor T11 is coupled to the third terminal of the transistor T10. The second terminal of the transistor T11 receives the enabling signal EM[n]. The third terminal of the transistor T11 is coupled to the voltage stabilizing node NDC. The third terminal of the transistor T11 may serve as an output terminal of the electronic circuit 400. The first terminal of the transistor T12 is coupled to the voltage stabilizing node NDB. The second terminal of the transistor T12 is coupled to the third terminal of the transistor T10. The third terminal of the transistor T12 is coupled to the reference low voltage signal VGL. The capacitor C1 is coupled between the voltage stabilizing node NDA and the reference low voltage signal VGL. The capacitor CP2 is coupled between the first terminal of the transistor T12 and the second terminal of the transistor T12. The capacitor CP1 is coupled between the second terminal of the transistor T12 and the reference low voltage signal VGL.

In this embodiment, a first terminal of the fifth compensation transistor TC5 is coupled to the voltage stabilizing node NDB. A second terminal of the fifth compensation transistor TC5 is coupled to the third connection node ND3. A third terminal of the fifth compensation transistor TC5 is coupled to the reference low voltage signal VGL. A first terminal of the sixth compensation transistor TC6 is coupled to the voltage stabilizing node NDB. A second terminal of the sixth compensation transistor TC6 is coupled to the fourth connection node ND4. A third terminal of the sixth compensation transistor TC6 is coupled to the reference low voltage signal VGL. In this embodiment, the transistors T1-T12, the first compensation transistor TC1, the second compensation transistor TC2, the third compensation transistor TC3, the fourth compensation transistor TC4, the fifth compensation transistor TC5, and the sixth compensation transistor TC6 are, for instance, p-type transistors, respectively, which should however not be construed as a limitation in the disclosure.

For instance, under the expected circumstances, the voltage value of the voltage stabilizing node NDB is at a low voltage level. When the transistors T5 and T6 become abnormal and become depletion mode transistors, the voltage value at the voltage stabilizing node NDB is biased toward a high voltage level. However, the fifth compensation transistor TC5 ensures the third connection node ND3 to have a low voltage level. Therefore, the current leakage at the voltage stabilizing node NDB having a high voltage level may be improved.

Besides, for instance, under the expected circumstances, the voltage value of the voltage stabilizing node NDC is at a low voltage level. When the transistors T8 and T9 become abnormal and become depletion mode transistors, the voltage value at the voltage stabilizing node NDC is biased toward a high voltage level. However, the sixth compensation transistor TC6 ensures the fourth connection node ND4 to have a low voltage level. Therefore, the current leakage at the voltage stabilizing node NDC having a high voltage level may be improved.

The electronic circuit 400 further includes a detection circuit 410, which should not be construed as a limitation in the disclosure. The detection circuit 410 detects the voltage value at the voltage stabilizing node NDA according to the scan signal SN[n], the reset signal RST[n], and a light-emitting enabling signal EM[n].

The detection circuit 410 includes transistors T13-T17. The first terminal of the transistor T13 receives the reset signal RST[n]. The second terminal of the transistor T13 is coupled to the voltage stabilizing node NDA. The first terminal of the transistor T14 receives the reset signal RST[n]. The second terminal of the transistor T14 is coupled to the third terminal of the transistor T13. The first terminal of the transistor T15 receives the scan signal SN[n]. The second terminal of the transistor T15 is coupled to the voltage stabilizing node NDA. The first terminal of the transistor T16 receives the scan signal SN[n]. The second terminal of the transistor T16 is coupled to the third terminal of the transistor T15. A first terminal of the transistor T17 receives the enabling signal EM[n]. A second terminal of the transistor T17 is coupled to the third terminal of the transistor T14 and the third terminal of the transistor T16. A third terminal of the transistor T17 is coupled to the reference low voltage signal VGL. Here, the transistors T13-T17 are p-type transistors, respectively, which should however not be construed as a limitation in the disclosure.

Figure 5:
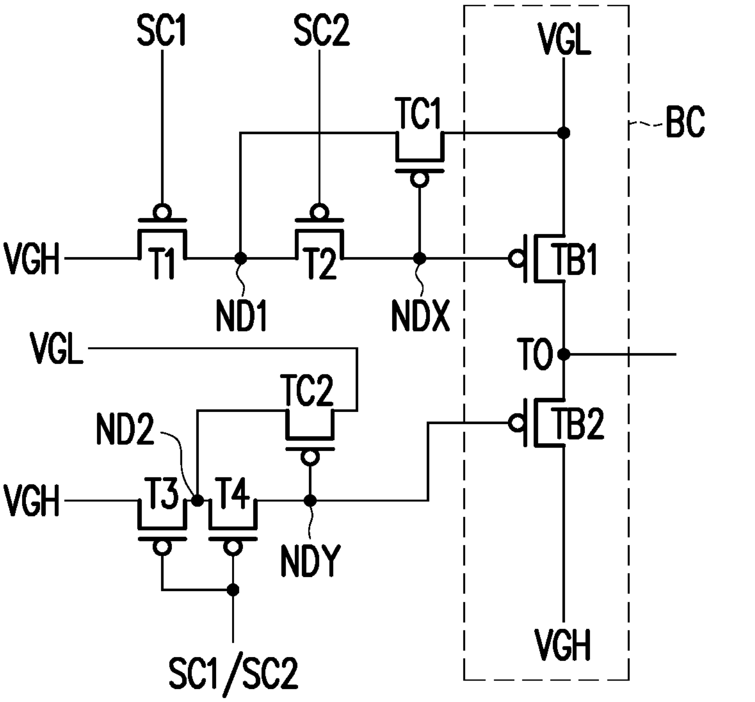
FIG. 5 is a schematic view of an electronic circuit according to a fifth embodiment of the disclosure.

Please refer to FIG. 5, which is a schematic view of an electronic circuit according to a fifth embodiment of the disclosure. In this embodiment, an electronic circuit 500 include the transistors T1-T4, the first compensation transistor TC1, the second compensation transistor TC2 and buffer transistors TB1 and TB2. The second terminal of the transistor T1 receives the reference high voltage signal VGH. The third terminal of the transistor T1 is coupled to the first connection node ND1. The second terminal of the transistor T2 is coupled to the first connection node ND1. The first terminal of the first compensation transistor TC1 is coupled to the third terminal of the transistor T2. The second terminal of the first compensation transistor TC1 is coupled to the first connection node ND1. The third terminal of the first compensation transistor TC1 receives the reference low voltage signal VGL.

The second terminal of the transistor T3 receives the reference high voltage signal VGH. The third terminal of the transistor T3 is coupled to the second connection node ND2. The second terminal of the transistor T4 is coupled to the second connection node ND2. The first terminal of the second compensation transistor TC2 is coupled to the third terminal of the transistor T4. The second terminal of the second compensation transistor TC2 is coupled to the second connection node ND2. The third terminal of the second compensation transistor TC2 receives the reference low voltage signal VGL.

A first terminal of the buffer transistor TB1 is coupled to the first terminal of the first compensation transistor TC1 and the third terminal of the transistor T2. A second terminal of the buffer transistor TB1 is coupled to the reference high voltage signal VGH. A third terminal of the buffer transistor TB1 is coupled to an output node TO. A first terminal of the buffer transistor TB2 is coupled to the first terminal of the second compensation transistor TC2 and the third terminal of the transistor T4. A second terminal of the buffer transistor TB2 is coupled to the output node TO. A third terminal of the buffer transistor TB2 receives the reference high voltage signal VGH. In this embodiment, the buffer transistors TB1 and TB2 may be at least one portion of a buffer circuit BC, for instance. The transistors T1-T4, the first compensation transistor TC1, the second compensation transistor TC2, and the buffer transistors TB1 and TB2 are, for instance, p-type transistors, respectively, which should however not be construed as a limitation in the disclosure.

For instance, under the expected circumstances, the voltage value of the third terminal of the transistor T2 (i.e., a voltage stabilizing node NDX) is at a low voltage level. When at least one of transistors T1 and T2 becomes abnormal and becomes a depletion mode transistor, the voltage value of the voltage stabilizing node NDX is biased toward a high voltage level. However, the first compensation transistor TC1 ensures the first connection node ND1 to have a low voltage level. Therefore, the current leakage at the voltage stabilizing node NDX having a high voltage level may be improved.

Besides, for instance, under the expected circumstances, the voltage value of the third terminal of the transistor T4 (i.e., a voltage stabilizing node NDY) is at a low voltage level. When at least one of the transistors T3 and T4 becomes abnormal and becomes a depletion mode transistor, the voltage value of the voltage stabilizing node NDY is biased toward a high voltage level. However, the second compensation transistor TC2 ensures the second connection node ND2 to have a low voltage level. Therefore, the current leakage at the voltage stabilizing node NDY having a high voltage level may be improved.

Therefore, when at least one of the transistors T1-T4 becomes abnormal and becomes a depletion mode transistor, the first compensation transistor TC1 and the second compensation transistor TC2 may reduce the possibility of outputting an error signal or prevent the buffer circuit BC from outputting an error signal due to the abnormality.

For instance, the first terminal of the transistor T1 receives a control signal SC1. The first terminal of the transistor T2 receives a control signal SC2. The first terminal of the transistor T3 and the first terminal of the transistor T4, for instance, receive the same control signal (e.g., one of the control signal SC1 and the control signal SC2). The type of the control signals is not limited in the disclosure, and the control signal SC1 and the control signal SC2 may be the same or different from each other, which may be determined according to the design requirements.

To sum up, the electronic circuit provided in one or more embodiments of the disclosure includes the compensation transistor, and the compensation transistor compensates relevant nodes (e.g., the connection node, a voltage stabilizing node, and so on). Hence, when the transistors are the depletion mode transistors, the compensation transistor is capable of reducing or preventing the connection node or other nodes from suffering from an unexpected bias.

Although the embodiments of the disclosure and the advantages thereof have been disclosed above, it should be understood that any person skilled in the art can make changes, substitutions, and modifications without departing from the spirit and scope of the disclosure, and the features of the embodiments can be arbitrarily mixed and replaced to form other new embodiments. In addition, the protection scope of the disclosure is not limited to the process, machine, manufacture, material composition, device, method, and steps in the specific embodiments described in the specification. Any person skilled in the art can understand conventional or future-developed processes, machines, manufactures, material compositions, devices, methods, and steps from the content of the disclosure as long as the same can implement substantially the same functions or achieve substantially the same results in the embodiments described herein. Therefore, the protection scope of the disclosure includes the above processes, machines, manufactures, material compositions, devices, methods, and steps. In addition, each claim constitutes a separate embodiment, and the protection scope of the disclosure further includes combinations of the claims and the embodiments. The protection scope of the disclosure should be defined by the appended claims.

What is claimed is:

1. An electronic circuit, comprising:

a first transistor;

a second transistor, wherein a first terminal of the first transistor is connected to a first terminal of the second transistor and a voltage stabilizing node, wherein a second terminal of the first transistor is connected to a second terminal of the second transistor and a first connection node, wherein the first terminal of the first transistor is a gate terminal of the first transistor, wherein the first terminal of the second transistor is a gate terminal of the second transistor;

a third transistor;

a fourth transistor, wherein a first terminal of the third transistor is connected to a first terminal of the fourth transistor and the voltage stabilizing node, wherein a second terminal of the third transistor is connected to a second terminal of a fourth transistor and a second connection node, wherein the first terminal of the third transistor is a gate terminal of the third transistor, wherein the first terminal of the fourth transistor is a gate terminal of the fourth transistor;

a first compensation transistor, comprising a first terminal, a second terminal, and a third terminal, wherein the first terminal of the first compensation transistor is connected to the second terminal of the first compensation transistor and the first connection node, and the third terminal of the first compensation transistor receives one of a scan signal and a reset signal; a second compensation transistor, comprising a first terminal, a second terminal, and a third terminal, wherein the second terminal of the second compensation transistor is connected to the second connection node, and the third terminal of the second compensation transistor receives a reference low voltage signal;

a third compensation transistor, wherein a first terminal of the third compensation transistor is connected to the first terminal of the second compensation transistor; and a fourth compensation transistor, coupled to the first compensation transistor, wherein a first terminal of the fourth compensation transistor is coupled to the first terminal of the second compensation transistor, wherein a second terminal of the fourth compensation transistor is coupled to the first connection node.

2. The electronic circuit according to claim 1, wherein a second terminal of the third compensation transistor is coupled to the third terminal of the second compensation transistor and the reference low voltage signal.

3. The electronic circuit according to claim 1, wherein a third terminal of the fourth compensation transistor is coupled to the second terminal of the first compensation transistor.

* * * * *